(12) United States Patent
Jadaun et al.

(10) Patent No.: US 12,173,238 B2
(45) Date of Patent: Dec. 24, 2024

(54) INTEGRATED PROCESS FOR HYDROTREATING A RENEWABLE FEEDSTOCK WITH IMPROVED CARBON MONOXIDE MANAGEMENT

(71) Applicant: UOP LLC, Des Plaines, IL (US)

(72) Inventors: Krishan Pratap Jadaun, Gurugram (IN); Hari S. Bajpai, Gurgaon (IN); Krishna Mani, Gurgaon (IN)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/349,432

(22) Filed: Jun. 16, 2021

(65) Prior Publication Data

US 2021/0403814 A1 Dec. 30, 2021

Related U.S. Application Data

(60) Provisional application No. 63/045,799, filed on Jun. 29, 2020.

(51) Int. Cl.
*C10G 3/00* (2006.01)
*C10G 31/08* (2006.01)
*C10G 67/02* (2006.01)

(52) U.S. Cl.
CPC .............. *C10G 3/52* (2013.01); *C10G 3/46* (2013.01); *C10G 31/08* (2013.01); *C10G 67/02* (2013.01); *C10G 2300/1014* (2013.01); *C10G 2300/1018* (2013.01); *C10G 2300/1037* (2013.01); *C10G 2300/4006* (2013.01);
(Continued)

(58) Field of Classification Search
CPC . C10G 3/52; C10G 3/46; C10G 31/08; C10G 67/02; C10G 2300/1014; C10G 2300/1018; C10G 2300/1037; C10G 2300/4006; C10G 2300/405;
(Continued)

(56) References Cited

U.S. PATENT DOCUMENTS 4,266,083 A * 5/1981 Huang ............... C10G 1/083
 208/415
8,043,600 B2 10/2011 Knudsen et al.
(Continued)

OTHER PUBLICATIONS

PCT Written Opinion and Search Report, date of mailing Oct. 21, 2021.
(Continued)

*Primary Examiner* — Michelle Stein
(74) *Attorney, Agent, or Firm* — Paschall & Associates, LLC; James C. Paschall (57) ABSTRACT

A process for hydrotreating a renewable feedstock with improved carbon monoxide management is disclosed. A mixture of renewable feedstock and hydrocarbon feedstock is treated in a hydrotreating reactor to produce a hydrotreated effluent stream and contacting the hydrotreated effluent stream with a water gas shift catalyst bed to produce a shift reactor effluent stream. The shift reactor effluent stream is passed to a cold separator to recover a cold vapor stream and recycling the cold vapor stream having reduced concentration of carbon monoxide to the hydrotreating zone. The subject matter disclosed provides an improved process and apparatus to reduce the accumulation of CO by converting CO present in the hydrotreated effluent stream to $CO_2$ using the water shift gas reaction.

17 Claims, 3 Drawing Sheets

(52) U.S. Cl.
CPC .............. *C10G 2300/405* (2013.01); *C10G 2300/4081* (2013.01); *C10G 2300/807* (2013.01); *C10G 2400/04* (2013.01)

(58) Field of Classification Search
CPC ...... C10G 2300/4081; C10G 2300/807; C10G 2400/004
See application file for complete search history.

(56) References Cited

U.S. PATENT DOCUMENTS

| | | | |
|---|---|---|---|
| 8,541,636 | B2 | 9/2013 | Vergel |
| 8,822,744 | B2 * | 9/2014 | Mizan .................. C10G 3/45 585/242 |
| 8,915,981 | B2 | 12/2014 | Marker et al. |
| 9,493,721 | B2 | 11/2016 | Raju et al. |
| 9,617,479 | B2 | 4/2017 | Fingland et al. |
| 9,850,185 | B2 * | 12/2017 | Petters .................. C10H 19/00 |
| 10,011,785 | B2 | 7/2018 | Eilos |
| 2002/0004533 | A1 * | 1/2002 | Wallace .................. C10K 3/04 518/712 |
| 2005/0197410 | A1 | 9/2005 | Lowe |
| 2006/0002848 | A1 * | 1/2006 | Tonkovich .............. C01B 3/16 423/656 |
| 2009/0077867 | A1 * | 3/2009 | Marker .................. C01B 3/16 44/308 |
| 2010/0043279 | A1 * | 2/2010 | Abhari .................. C10L 3/12 44/308 |
| 2010/0061927 | A1 * | 3/2010 | Knudsen ................ C10G 3/46 423/652 |
| 2011/0047862 | A1 * | 3/2011 | Mayeur .................. C10G 3/50 422/187 |
| 2011/0155636 | A1 * | 6/2011 | Hanks .................. C10G 45/02 208/88 |
| 2012/0161077 | A1 * | 6/2012 | Moulton .................. C10G 2/32 252/373 |
| 2014/0073827 | A1 * | 3/2014 | Steele .................. C10G 3/45 585/310 |
| 2014/0230316 | A1 * | 8/2014 | Liu .................. C10L 1/02 44/307 |
| 2015/0080621 | A1 * | 3/2015 | Powell .................. C01B 3/32 422/162 |
| 2015/0232764 | A1 * | 8/2015 | Li .................. B01J 8/0492 422/198 |
| 2016/0096998 | A1 * | 4/2016 | Sherwood ............... C10G 2/34 422/162 |
| 2016/0289576 | A1 * | 10/2016 | Eilos .................. C01B 3/38 |
| 2018/0010052 | A1 * | 1/2018 | Sinha .................. C10G 3/46 |

OTHER PUBLICATIONS

Rasmus Egeberg, et al., Hydrotreating in the production of green diesel, www.digitalrefining.com/article/1000156, PTQ Q2 2010.
Search Report and Written Opinion for 21834150.1 dated Jun. 27, 2024.

* cited by examiner

INTEGRATED PROCESS FOR HYDROTREATING A RENEWABLE FEEDSTOCK WITH IMPROVED CARBON MONOXIDE MANAGEMENT

CROSS-REFERENCE TO RELATED APPLICATIONS

This application claims priority from U.S. Provisional Application No. 63/045,799, filed Jun. 29, 2020, which is incorporated herein in its entirety.

FIELD

The field relates to an improved process for carbon monoxide management during hydrotreatment of a renewable feedstock. More particularly, the field relates to improvement in carbon monoxide management by converting the CO produced during the hydrotreating of renewable feedstock to $CO_2$ and hydrogen by water gas shift reaction.

BACKGROUND

Due to environment regulations, governmental regulations and incentives, and an increasing worldwide demand for energy, there is an increasing emphasis on hydrocarbon fuels derived from renewable feedstocks. Currently, refiners are interested in processing of renewable feedstocks such as vegetable oil and animal oil with or without hydrocarbon feed. Refiners are processing renewable feedstocks in existing refinery units to minimize the installation and operational cost and reduce the revamp requirement.

Hydrotreating is used to convert hydrocarbons in the presence of hydrotreating catalyst and hydrogen to more valuable products. Hydrotreating is used to remove heteroatoms such as sulfur and nitrogen from hydrocarbon streams to meet fuel specifications and to saturate olefinic compounds. Hydrotreating also removes undesirable oxygen present by hydrodeoxygenation or hydrodecarboxylation reactions. Due to the side reactions during the hydrotreating of the renewable feed, production of carbon dioxide $CO_2$, methane $CH_4$, carbon monoxide CO and water occurs. The valuable hydrogen is separated from the effluent exiting a hydrotreating reactor and then recycled back to the hydrotreating reactor after purification. Conventionally, gas purification includes gas scrubbing by amine wash units that remove $CO_2$ and $H_2S$ but have a low affinity for removal of CO. Therefore, CO builds up in the recycle gas. The presence of CO in the hydrogen gas poisons the hydrotreating catalyst. Additional catalyst loading is required to compensate for catalyst poisoning otherwise it will result in reduced catalyst cycle length.

Generally, CO build up in recycle gas is reduced by purging a portion of the recycle gas which ultimately results in loss of hydrogen present in the recycle gas. Methanation, to convert CO to CH4, has been proposed. However, methanation reactions are hydrogen consuming reactions and CH4 builds up in the recycle gas loop which ultimately necessitates a purge. So methanation reduces the CO poisoning at the expense of reduced recycle gas purity and continuous loss of valuable hydrogen. Therefore, conventional CO management processes are not effective in limiting the amount of CO in recycle gas and, thus, limit the co-processing of renewable feedstocks.

Accordingly, there is a continuing need for coprocessing renewable feedstock in existing refinery setup which provides economic advantage with minimal investment. There is a continuing need to increase the co-processing capabilities of renewable feedstock and minimize the CO build-up in recycle gas loop by converting CO to a gas which can be easily removed from recycle gas loop.

SUMMARY

We have found an improved process for hydrotreating a renewable feedstock with better CO management process that converts the CO present in a recycle gas loop to $CO_2$ using a water gas shift reaction. The process comprises hydrotreating the renewable feedstock under hydrotreating conditions to produce a hydrotreated effluent stream. The hydrotreated effluent stream is passed to a water gas shift catalyst bed to produce a shift reactor effluent stream and then passing the shift reactor effluent stream to a cold separator to recover a cold vapor stream comprising hydrogen and a cold liquid stream comprising fuel range products. The cold vapor stream having a reduced concentration of carbon monoxide is then recycled to the hydrotreating zone.

A hot separator may also be present downstream of the water gas shift catalyst bed and upstream of the cold separator. The water gas shift catalyst bed may also be located inside the hot separator thus forming a single vessel and eliminating the need of separate vessel.

In the water gas shift reaction, one mole of $H_2$ is produced per mole of CO. The water gas shift catalyst bed is placed directly downstream of the hydrotreating reactor. This process produces net hydrogen while reducing the CO build up and improves the recycle gas purity significantly. $CO_2$ can be easily removed with a scrubber.

These and other features, aspects, and advantages of the present disclosure are further explained by the following detailed description, drawings and appended claims.

Skilled artisans will appreciate that elements in the drawings are illustrated for simplicity and clarity and have not necessarily been drawn to scale. For example, the dimensions of some of the elements in the drawings may be exaggerated relative to other elements to help improve understanding of various embodiments of the present disclosure. Also, common but well-understood elements that are useful or necessary in a commercially feasible embodiment may not be depicted in order to facilitate a less obstructed view of these various embodiments of the present disclosure.

Definitions

The following detailed description is merely exemplary in nature and is not intended to limit the application and uses of the embodiment described. Furthermore, there is no intention to be bound by any theory presented in the preceding background or the following detailed description.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "indirect communication" means that flow from the upstream component enters the downstream component after passing through a fractionation or conversion unit to undergo a compositional change due to physical fractionation or chemical conversion.

The term "bypass" means that the object is out of downstream communication with a bypassing subject at least to the extent of bypassing.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.).

As used herein, the term "diesel cut point" is between about 343° C. (650° F.) and about 399° C. (750° F.) using the TBP distillation method.

As used herein, the term "diesel boiling range" means hydrocarbons boiling in the range of between about 132° C. (270° F.) and the diesel cut point using the TBP distillation method.

As used herein, the term "predominant" or "predominate" means greater than 50%, suitably greater than 75% and preferably greater than 90%.

As used herein, the term "rich" can mean that the outlet stream has a greater concentration of the indicated component than in the inlet stream to a vessel.

As used herein, the term "overhead stream" can mean a stream withdrawn at or near a top of a vessel, such as a column.

As used herein, the term "bottoms stream" can mean a stream withdrawn at or near a bottom of a vessel, such as a column.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottom stream back to the bottom of the column. Feeds to the columns may be preheated. The top pressure is the pressure of the overhead vapor at the outlet of the column. The bottom temperature is the liquid bottom outlet temperature. Overhead lines and bottom lines refer to the net lines from the column downstream of the reflux or reboil to the column. Alternatively, a stripping stream may be used for heat input near the bottom of the column. Stripper columns may omit a reboiler at a bottom of the column and instead provide heating requirements and separation impetus from a fluidized inert media such as steam. Stripping columns typically feed a top tray and take main product from the bottom.

As used herein, the term "stream", "feed", "product", "part" or "portion" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3, Cn where "n" represents the number of carbon atoms in the one or more hydrocarbon molecules or the abbreviation may be used as an adjective for, e.g., non-aromatics or compounds. Similarly, aromatic compounds may be abbreviated A6, A7, A8, An where "n" represents the number of carbon atoms in the one or more aromatic molecules. Furthermore, a superscript "+" or "−" may be used with an abbreviated one or more hydrocarbons notation, e.g., C3+ or C3−, which is inclusive of the abbreviated one or more hydrocarbons. As an example, the abbreviation "C3+" means one or more hydrocarbon molecules of three or more carbon atoms.

As used herein, the term "zone" or "unit" can refer to an area including one or more equipment items and/or one or more sub-zones. Equipment items can include, but are not limited to, one or more reactors or reactor vessels, separation vessels, distillation towers, heaters, exchangers, pipes, pumps, compressors, and controllers. Additionally, an equipment item, such as a reactor, dryer, or vessel, can further include one or more zones or sub-zones.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

DETAILED DESCRIPTION

The process and apparatus described herein are particularly useful for co-processing a hydrocarbon feedstock along with a renewable feedstock in a hydrotreating reactor to provide a fuel range product stream. Applicants have disclosed an improved CO management process and apparatus that converts the CO present in the hydrotreating effluent to $CO_2$ using a water gas shift catalyst. $CO_2$ can be easily removed in a scrubber or by taking out a purge stream. This process and apparatus will reduce the amount of CO in the recycle gas and thus reduce the risk of catalyst poisoning and hence increase catalyst life. Therefore, this process and apparatus allow more renewable feed to be processed in existing refineries. In the water gas shift reaction, hydrogen gas ($H_2$) is also produced, 1 mole of $H_2$ per mole of CO, thus, reducing the makeup hydrogen requirement and increasing the recycle gas purity.

Figure 1:
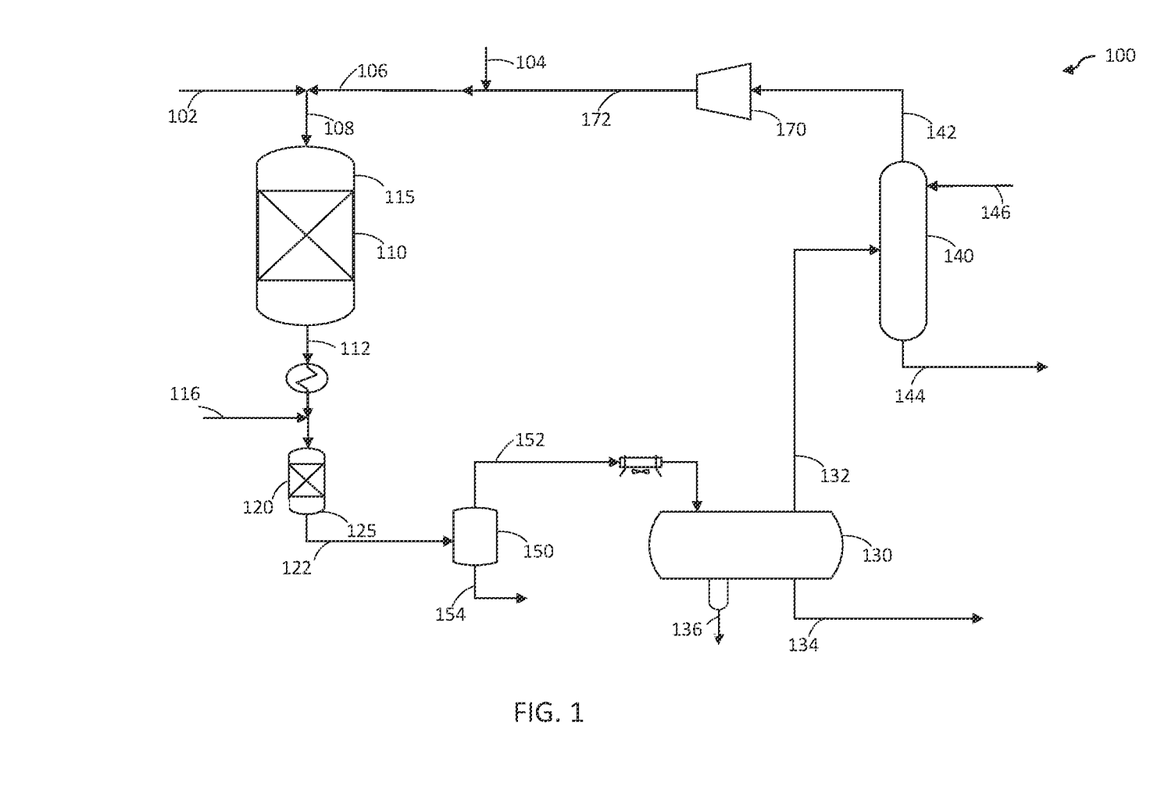
FIG. 1 is a schematic representation of hydrotreating a renewable feedstock using the process of the present disclosure.

Processes for producing fuel range products such as diesel, naphtha, LPG, kerosene from co-processing of hydrocarbon feedstock and renewable feedstock or processing just renewable feedstock have been developed. An example of an integrated process and apparatus 100 is shown in FIG. 1 which includes an integrated hydrotreating and water gas shift reaction steps, a hot separation step, a cold separation step, and a scrubbing step. As shown in the figures, the integrated process and apparatus 100 includes a hydrotreating reactor 115, a water gas shift reactor 125, a hot separator 150, and a cold separator 130.

As shown in FIG. 1, a feed stream in a feed line 102 is admixed with a hydrogen stream in a hydrogen line 106. The feed stream comprises a renewable feedstock or a petroleum feedstock or a mixture of renewable feedstock and a petroleum hydrocarbon feedstock. The petroleum hydrocarbon feedstock as used herein may be diesel, vacuum gas oil (VGO), kerosene, other cracked feeds or shale oil. The renewable feedstock as used herein may be a vegetable oil or other oil from a biological origin such as animal oil. The renewable feedstock comprises 3-100 wt % or 5-95 wt % or 5-30 wt % of the feed stream when combined with petroleum feedstock.

Examples of renewable feedstock that can be used in accordance with this disclosure include, but are not limited to plant oil such as canola oil, corn oil, soy oil, rapeseed oil, soybean oil, colza oil, tall oil, sunflower oil, hempseed oil, olive oil, linseed oil, coconut oil, jatropha oil, castor oil, peanut oil, palm oil, mustard oil, cottonseed oil, and algal oil; animal oil such as tallow, lard, milk fats, fish oil, poultry fats and other various waste streams such as cooking oil, yellow and brown greases, and sewage sludge. Additional examples of renewable feedstock may include train oil, pyrolysis oil, liquids derived from the gasification of coal, liquids derived from depolymerization, synthetic oils, and mixtures thereof.

A resulting admixture in a line 108 is contacted with a hydrotreating catalyst and hydrogen in a hydrotreating bed 110 of the hydrotreating reactor 115 operating under hydrotreating conditions to provide a hydrotreated effluent stream in a hydrotreated effluent line 112.

The term "hydrotreating" as used herein refers to processes wherein a hydrogen-containing treat gas is used in the presence of suitable catalysts which are primarily active for the removal of heteroatoms, such as sulfur, nitrogen, oxygen and metals from the hydrocarbon feedstock. In hydrotreating, hydrocarbons with double and triple bonds such as olefins may be saturated. Aromatics may also be saturated. Some hydrotreating processes are specifically designed to saturate aromatics. In hydrotreating, a feed derived from a biological source is subjected to deoxygenation.

Suitable hydrotreating catalysts may be any known conventional hydrotreating catalyst and may include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal may be selected from palladium and platinum. It is within the scope of the present disclosure that more than one type of hydrotreating catalyst may be used in the same reaction vessel. The Group VIII metal may typically be present in an amount ranging from about 2 to about 20 wt %, or from about 4 to about 12 wt %. The Group VI metal may typically be present in an amount ranging from about 1 to about 25 wt %, or from about 2 to about 25 wt %.

Typical hydrotreating temperatures may range from about 204° C. (400° F.) to about 420° C. (788° F.), or from about 275° C. (527° F.) to about 390° C. (734° F.) with pressures from about 3.1 MPa (450 psig) to about 17.3 MPa (2500 psig), or from about 3.5 MPa (500 psig) to about 6.9 MPa (1000 psig). A liquid hourly space velocity of feedstock from about 0.1 to about 10 $hr^{-1}$, or from about 0.5 to about 2 $hr^{-1}$ may be used with a hydrotreating catalyst or a combination of hydrotreating catalysts.

The hydrotreated effluent stream in the hydrotreated effluent line 112 is withdrawn from the hydrotreating reactor 115 and the entire hydrotreated effluent stream is contacted with water gas shift catalyst in a water gas shift catalyst bed 120 in the water gas shift reactor 125 operating under water gas shift reaction conditions. The water gas shift catalyst bed 120 is in downstream communication with the hydrotreating bed 110. The water shift gas reaction converts the CO present in the hydrotreated effluent stream to $CO_2$. The hydrotreated effluent stream may be combined with a water stream in a water line 116. The water may be present in the form of steam or liquid. The water is added to the hydrotreated effluent line 112 upstream of the water gas shift catalyst bed 120 in an amount of about 50 to about 1000 mol %, or about 200 to about 1000 mol % of carbon monoxide in the hydrotreated effluent stream.

The water gas shift reaction reacts carbon monoxide and water vapor to form carbon dioxide and hydrogen as shown in Formula (1):

$$CO + H_2O \rightleftharpoons CO_2 + H_2 \qquad (1)$$

The water gas shift reaction is an equilibrium reaction favored by low temperature and higher reactant concentration. Accordingly, in order to ensure stoichiometric amounts of carbon monoxide and water are available and to ensure that a desired amount of the carbon monoxide present in the gas is reacted in the shift reaction for hydrogen production, excess water or steam injection may be added.

A suitable water gas shift catalyst may be any known conventional water gas shift catalyst such as catalyst comprising at least one metal selected from iron, cobalt, chromium, nickel, copper, zinc, yttrium, zirconium, niobium, molybdenum, technetium, ruthenium, rhodium, palladium, silver, cadmium, lanthanum, hafnium, tantalum, tungsten, rhenium, osmium, iridium, platinum, gold, and mercury. Suitably, the catalyst comprises at least one metal selected from cobalt, iron, ruthenium, copper, and nickel. A preferred catalyst for the water gas shift reaction includes copper and zinc oxide. The water gas shift metal may be deposited on a support. Supports include inorganic oxides such as silicas, aluminas, titanias, zirconia, yttria, and molecular sieves. Other supports include, but are not limited to, carbon, silicon carbide, diatomaceous earth, and clays. The catalyst metal may be deposited on the support by aqueous metal salt impregnation. Other suitable water gas shift catalysts may be sulfided molybdenum on alumina, titania or alumina-titania promoted with nickel and/or cobalt or un-promoted, sulfided nickel on alumina or any other sulfur tolerant water gas shift catalyst. Catalysts suitable for hydrotreating may also be used as the water-gas shift catalyst.

Operating temperatures for the water gas shift reaction may range from about 100° C. (212° F.) to about 345° C. (653° F.), or from about 150° C. (302° F.) to about 300° C. (572° F.) and operating pressure will be the same as that of the hydrotreating reaction. Applicants have surprisingly found that operating the water gas shift reaction at a temperature range from about 150° C. to about 300° C. produces superior results. The water gas shift reaction operates at a lower temperature than the hydrotreating reaction, so a cooler on the hydrotreated effluent line 112 can cool the hydrotreated effluent to the water gas shift temperature.

A shift reactor effluent stream in a shift effluent line 122 is withdrawn from the water gas shift reactor 125 and introduced into a hot separator 150 to provide a hot vapor stream in a hot separator overhead line 152 extending from a top of the hot separator 150 and a hot liquid stream in a hot separator bottoms line 154 extending from a bottom of the hot separator 150. The hot separator 150 operates at about 177° C. (350° F.) to about 371° C. (700° F.) or at about 232° C. (450° F.) to about 315° C. (600° F.). The hot separator 150 may be operated at a slightly lower pressure than the water gas shift catalyst bed 120 accounting for pressure drop through the lines. The hot separator 150 may be operated at pressures between about 3.5 MPa (gauge) (450 psig) and about 6.9 MPa (gauge) (2500 psig).

The hot vapor stream may be separated in the cold separator 130 to provide a cold vapor stream in a cold separator overhead line 132 extending from a top of the cold separator 130 and a cold liquid stream in a cold separator bottoms line 134 extending from a bottom of the cold separator 130. The hot vapor stream may be passed through an air cooler before entering the cold separator 130. Condensed water in a line 136 may be removed in a boot from the cold separator 130. Generally, the cold separator 130 can be operated at no more than about 100° C. (212° F.), or no more than about 70° C. (158° F.) and at least 50° C. (122° F.). The hot separator 150 and the cold separator 130 are used to reduce the temperature of the shift reactor effluent stream while separating gases from liquids.

The hot liquid stream in the hot separator bottoms line 154 may be further processed in a stripper column to separate fuel range products such as naphtha, diesel, LPG, kerosene. The cold liquid stream in the cold separator bottoms line 134 may also be further processed in the stripper column. In another embodiment, the hot liquid stream may be mixed with the cold liquid stream before entering the stripper column.

The hydrogen gas in the cold vapor stream 132 may be purified in a recycle gas scrubber 140 by contact with a lean amine stream to remove contaminants such as carbon dioxide and hydrogen sulfide and obtained as a top stream in line 142 extending from the recycle gas scrubber. The hydrogen gas in the top stream in line 142, having a reduced concentration of carbon monoxide and other contaminants, may be sent to a recycle gas compressor 170 to provide a recycle hydrogen stream 172 in route to the hydrotreating reactor 115. In another embodiment, a portion of the cold vapor stream may be purged to remove carbon dioxide and other contaminants before recycling to the recycle gas compressor 170 in the event that the recycle gas scrubber 140 is not available or is of limited capacity.

A make-up hydrogen stream in line 104 may be mixed with the recycle hydrogen stream 172. The make-up hydrogen stream may be provided to a make-up compressor. The make-up compressor may have up to five stages of compression and discharge hydrogen stream at a pressure of 2 to about 24 MPa. The make-up hydrogen stream from the compressor can supplement the recycle hydrogen stream 172.

This process and apparatus produce net hydrogen while reducing the CO build up and improves the recycle gas purity. $CO_2$ is easy to remove by using a scrubber or taking out a purge stream.

Figure 2:
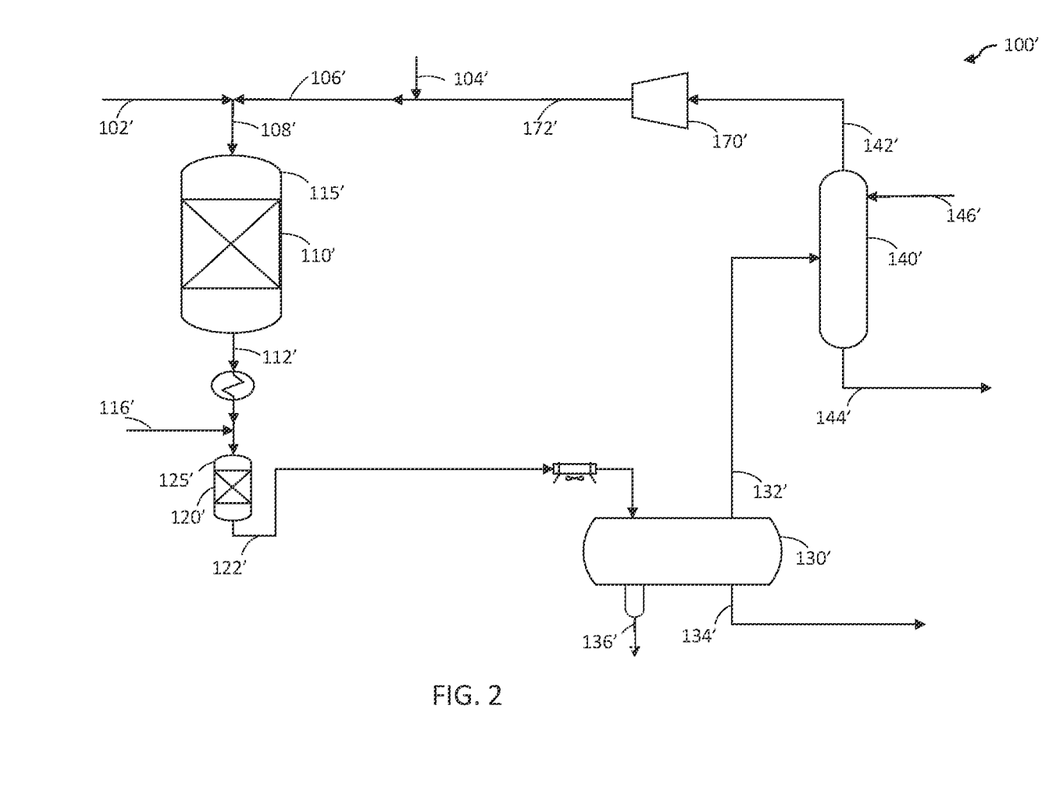
FIG. 2 is an alternative schematic representation of hydrotreating a renewable feedstock using the process of the present disclosure.
Figure 3:
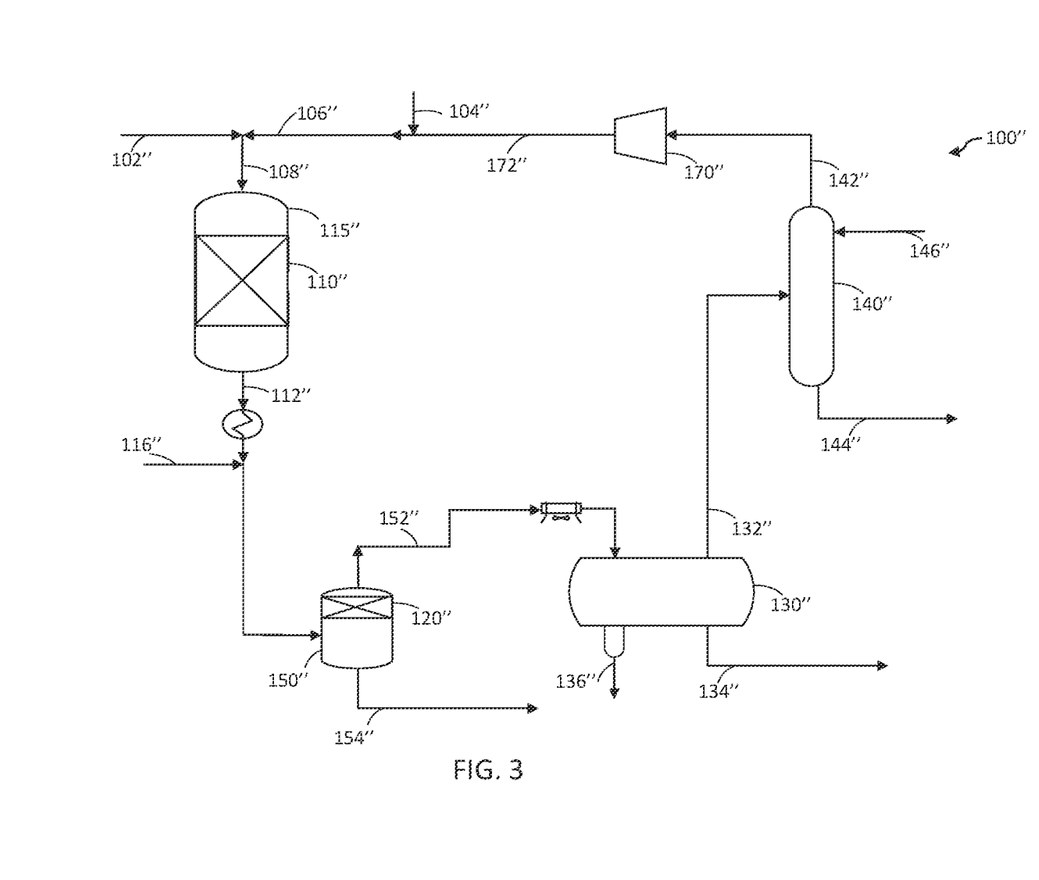
FIG. 3 is an alternative schematic representation of hydrotreating a renewable feedstock using the process of the present disclosure.

FIG. 2 and FIG. 3 show alternative embodiments of the process and apparatus of the present subject matter shown in FIG. 1 for hydrotreating a renewable feedstock with improved carbon monoxide management. The similar components in FIG. 2 and FIG. 3 that were described above for FIG. 1 will not be described again. Many of the elements in FIG. 2 and FIG. 3 have the same configuration as in FIG. 1 and bear the same reference number. Elements in FIG. 2 that correspond to elements in FIG. 1 but have a different configuration bear the same reference numeral as in FIG. 1 but are marked with a prime symbol ('). Elements in FIG. 3 that correspond to elements in FIG. 1 but have a different configuration bear the same reference numeral as in FIG. 1 but are marked with a double prime symbol (").

Turning to FIG. 2, the overall process and apparatus 100' is similar to overall process and apparatus 100 of FIG. 1, however, FIG. 2 differs in eliminating a hot separator present downstream of a water gas shift reactor 125'. A shift reactor effluent stream in a shift effluent line 122' withdrawn from the water gas shift reactor 125' is sent directly to a cold separator 130' rather than first sending it to a hot separator before the cold separator. This embodiment is beneficial for the refiners which do not employ a hot separator in their current hydroprocessing unit.

The shift reactor effluent stream in the shift effluent line 122' may be separated in the cold separator 130' to provide a cold vapor stream in a cold separator overhead line 132' extending from a top of the cold separator 130' and a cold liquid stream in a cold separator bottoms line 134' extending from a bottom of the cold separator 130'. The shift reactor effluent stream in the shift effluent line 122' may be passed through an air cooler before entering the cold separator 130'. Condensed water in a line 136' may be removed in a boot from the cold separator 130'. Generally, the cold separator 130' can be operated at no more than about 100° C. or no more than about 70° C. and at least 50° C. The cold separator 130 is used to reduce the temperature of the shift reactor effluent stream while separating gases from liquids.

Turning to FIG. 3, the overall process and apparatus 100" is similar to overall process and apparatus 100 of FIG. 1, however, FIG. 3 differs in locating a water gas shift catalyst bed in a hot separator 120". A water gas shift catalyst bed 120" is located in a hot separator 150" and above an inlet to the hot separator 150". This embodiment eliminates the need for a separate vessel by placing the water gas shift catalyst bed 120" in the hot separator 150".

A hydrotreated effluent stream in the hydrotreated effluent line 112" is withdrawn from the hydrotreating bed reactor 115", cooled and passed to a hot separator 150" to flash a vapor stream. Water in line 116" may be added to the hydrotreated effluent in the hydrotreated effluent line 112" upstream of the hot separator 150". A hot liquid stream in a hot separator bottoms line 154" extending from a bottom of the hot separator 150" is also recovered. The vapor stream from the hot separator 150" is contacted with water gas shift catalyst in a water gas shift catalyst bed 120" located above the inlet to the hot separator 150" to produce a shift catalyst effluent stream 152". The shift catalyst effluent stream 152" may be separated in the cold separator 130" to provide a cold vapor stream in a cold separator overhead line 132" extending from a top of the cold separator 130" and a cold liquid stream in a cold separator bottoms line 134" extending from a bottom of the cold separator 130". The shift catalyst effluent stream 152" may be passed through an air cooler before entering the cold separator 130.

Overall, aspects of the invention are associated with a process and apparatus for hydrotreating a renewable feedstock with improved carbon monoxide management. A mixture of renewable feedstock and perhaps petroleum hydrocarbon feedstock is treated in a hydrotreating reactor to produce a hydrotreated effluent stream and contacting the hydrotreated effluent stream with a water gas shift catalyst bed to produce a shift reactor effluent stream. The subject matter disclosed provides an improved processes and apparatuses to reduce the accumulation of CO by converting CO present in the hydrotreated effluent stream to $CO_2$ using the water shift gas reaction.

EXAMPLES

Experiments were performed to study the impact of temperature on the water gas shift reaction. Tests were conducted comparing CO conversion in the conditions comprising a preferred temperature range of 150-300° C. with the operating conditions comprising temperatures outside of the preferred range. The light naphtha feed was doped with tertiary dibutyl disulfide and cyclohexylamine to simulate the conditions at the outlet of the hydrotreater. The pilot plant was operated at three different temperature ranges as shown in the Table. Test 1 was conducted at a temperature value of 150° C. Test 2 was conducted at a temperature value of 270° C., and Test 3 was conducted at a temperature value of 330° C. The results of these three tests are shown in the Table. It is sent to water gas shift reactor in liquid form but as soon as it enters the reactor it will convert to vapor.

TABLE

|  | Units | Test 1: Below 150° C. | Test 2: 150-300° C. | Test 3: Above 300° C. |
|---|---|---|---|---|
| Temperature | ° C. | 140 | 270 | 330 |
| Pressure (gauge) | Kg/cm$^2$ | 45.0 | 45.0 | 45.0 |
| Catalyst Volume | cm$^3$ | 30.0 | 30.0 | 30.0 |
| H$_2$O Flow Rate | cm$^3$/hr | 15.0 | 15.0 | 15.0 |
| H$_2$ Flow Rate | standard cm$^3$/min | 1050.0 | 1050.0 | 1050.0 |
| CO Flow Rate | standard cm$^3$/min | 450.0 | 450.0 | 450.0 |
| Light Naphtha Flow Rate | cm$^3$/hr | 24.2 | 24.2 | 24.2 |
| Contact Time | sec | 1.2 | 1.2 | 1.2 |
| H$_2$O to CO Molar Ratio |  | 6.0 | 6.0 | 6.0 |
| CO Conversion | mol % | 30.2 | 80.1 | 50.4 |

It was surprising that water gas shift reaction operating at a temperature between 150-300° C., and specifically, 270° C., exhibited the highest CO conversion of 80.1%.

While the subject matter has been described with what are presently considered the preferred embodiments, it is to be understood that the subject matter is not limited to the disclosed embodiments, but it is intended to cover various modifications and equivalent arrangements included within the scope of the appended claims.

Specific Embodiments

While the following is described in conjunction with specific embodiments, it will be understood that this description is intended to illustrate and not limit the scope of the preceding description and the appended claims.

A first embodiment of the invention is an integrated process for hydrotreating a renewable feedstock comprising hydrotreating the renewable feedstock in the presence of a hydrogen stream in a hydrotreating reactor under hydrotreating conditions to produce a hydrotreated effluent stream; contacting the entire hydrotreated effluent stream with a water gas shift catalyst under water gas shift reaction conditions to produce a shift reactor effluent stream; passing the shift reactor effluent stream to a cold separator to recover a cold vapor stream and a cold liquid stream comprising diesel; and recycling the cold vapor stream having reduced concentration of carbon monoxide to the hydrotreating zone.

An embodiment of the invention is one, any or all of prior embodiments in this paragraph up through the first embodiment in this paragraph, wherein the water gas shift reactor is operating at a temperature range of about 150 to about 300° C. An embodiment of the invention is one, any or all of prior embodiments in this paragraph up through the first embodiment in this paragraph, wherein passing the shift reactor effluent stream to the cold separator comprises passing the shift reactor effluent stream to a hot separator to recover a hot vapor stream and passing the hot vapor stream to the cold separator. An embodiment of the invention is one, any or all of prior embodiments in this paragraph up through the first embodiment in this paragraph, further comprising combining a petroleum feedstock with the renewable feedstock. An embodiment of the invention is one, any or all of prior embodiments in this paragraph up through the first embodiment in this paragraph, wherein the petroleum feedstock comprises diesel, shale oil, kerosene, gas oil and cracked feeds. An embodiment of the invention is one, any or all of prior embodiments in this paragraph up through the first embodiment in this paragraph, wherein the renewable feedstock comprises in an amount of 5-95 wt % of the feedstock. An embodiment of the invention is one, any or all of prior embodiments in this paragraph up through the first embodiment in this paragraph, wherein the renewable feedstock comprises vegetable oil or animal oil. An embodiment of the invention is one, any or all of prior embodiments in this paragraph up through the first embodiment in this paragraph, further comprising passing the cold vapor stream to a recycle gas scrubber for the removal of hydrogen sulfide and carbon dioxide to produce a recycle hydrogen stream. An embodiment of the invention is one, any or all of prior embodiments in this paragraph up through the first embodiment in this paragraph, wherein water is added to the water gas shift catalyst bed to react with the carbon monoxide present in the hydrotreated effluent stream and produce the shift reactor effluent stream comprising carbon dioxide and hydrogen. An embodiment of the invention is one, any or all of prior embodiments in this paragraph up through the first embodiment in this paragraph, wherein water is added to the water gas shift catalyst bed in an amount of 200-1000 mol % of carbon monoxide. An embodiment of the invention is one, any or all of prior embodiments in this paragraph up through the first embodiment in this paragraph, wherein water is added to the water gas shift catalyst bed in the form of steam or liquid.

A second embodiment of the invention is a process for hydrotreating a renewable feedstock comprising combining a hydrocarbon feedstock and the renewable feedstock to form a combined feed; hydrotreating the combined feed in the presence of a hydrogen stream in a hydrotreating reactor under hydrotreating conditions to produce a hydrotreated effluent stream; passing the hydrotreated effluent stream through a hot separator to flash a vapor stream; contacting the vapor stream with a water gas shift catalyst located above the inlet to the hot separator to produce a shift catalyst effluent stream; passing the shift catalyst effluent stream to a cold separator to recover a cold vapor stream and a cold liquid stream comprising diesel; passing the cold vapor stream to a recycle gas scrubber for the removal of hydrogen sulfide and carbon dioxide to produce a recycle hydrogen stream; and recycling the recycle hydrogen stream having reduced concentration of hydrogen sulfide and carbon dioxide to the hydrotreating reactor. An embodiment of the invention is one, any or all of prior embodiments in this paragraph up through the second embodiment in this paragraph, wherein the water gas shift catalyst reaction is operated at a temperature range of about 150 to about 300° C. An embodiment of the invention is one, any or all of prior embodiments in this paragraph up through the second embodiment in this paragraph, wherein the hydrocarbon feedstock comprises diesel, shale oil, kerosene, gas oil and cracked feeds. An embodiment of the invention is one, any or all of prior embodiments in this paragraph up through the second embodiment in this paragraph, wherein the renewable feedstock comprises vegetable oil or animal oil. An embodiment of the invention is one, any or all of prior embodiments in this paragraph up through the second embodiment in this paragraph, wherein the renewable feedstock comprises 5-95 wt % of combined feed. An embodiment of the invention is one, any or all of prior embodiments in this paragraph up through the second embodiment in this paragraph, wherein water is added to the water gas shift catalyst bed in the form of steam or liquid.

A third embodiment of the invention is an apparatus for hydrotreating a renewable feedstock comprising a hydrotreating reactor operating under hydrotreating conditions configured to produce a hydrotreated effluent stream; a hot separator in fluid communication with the hydrotreating reactor and configured to vaporize a flash stream from the hydrotreated effluent stream; a water gas shift catalyst bed located above an inlet to the hot separator to receive the flash stream and configured to produce a shift catalyst effluent stream comprising carbon dioxide and hydrogen which exits in a hot separator overhead line; a cold separator in fluid communication with the hot separator overhead line and configured to recover a cold vapor stream and a cold liquid stream comprising diesel. An embodiment of the invention is one, any or all of prior embodiments in this paragraph up through the third embodiment in this paragraph, wherein a recycle gas scrubber is in fluid communication with the cold separator configured for removal of hydrogen sulfide and carbon dioxide from the cold vapor stream. An embodiment of the invention is one, any or all of prior embodiments in this paragraph up through the third embodiment in this paragraph, wherein the water gas shift catalyst bed is located in the hot separator comprising a single vessel.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. An integrated process for hydrotreating a renewable feedstock comprising:
   hydrotreating the renewable feedstock in the presence of a hydrogen stream in a hydrotreating reactor under hydrotreating conditions to produce a hydrotreated effluent stream;
   cooling the hydrotreated effluent stream to provide a cooled hydrotreated effluent stream;
   contacting the entire cooled hydrotreated effluent stream with a water gas shift catalyst under water gas shift reaction conditions to produce a shift reactor effluent stream, wherein the water gas shift reactor is operating at a lower temperature than the hydrotreating reactor;
   passing the shift reactor effluent stream to a cold separator to recover a cold vapor stream and a cold liquid stream comprising diesel; and
   recycling the cold vapor stream having reduced concentration of carbon monoxide to the hydrotreating zone.

2. The process of claim 1, wherein passing the shift reactor effluent stream to the cold separator comprises passing the shift reactor effluent stream to a hot separator to recover a hot vapor stream and passing the hot vapor stream to the cold separator.

3. The process of claim 1, further comprising combining a petroleum feedstock with the renewable feedstock.

4. The process of claim 3, wherein the petroleum feedstock comprises one or more of diesel, shale oil, kerosene, gas oil and cracked feeds.

5. The process of claim 3, wherein the renewable feedstock comprises in an amount of 5-95 wt % of the feedstock.

6. The process of claim 1, wherein the renewable feedstock comprises vegetable oil or animal oil.

7. The process of claim 1, further comprising passing the cold vapor stream to a recycle gas scrubber for the removal of hydrogen sulfide and carbon dioxide to produce a recycle hydrogen steam.

8. The process of claim 1, wherein water is added to the water gas shift catalyst bed to react with the carbon monoxide present in the hydrotreated effluent stream and produce the shift reactor effluent stream comprising carbon dioxide and hydrogen.

9. The process of claim 1, wherein water is added to the water gas shift catalyst bed in an amount of 200-1000 mol % of carbon monoxide.

10. The process of claim 1, wherein water is added to the water gas shift catalyst bed in the form of steam or liquid.

11. A process for hydrotreating a renewable feedstock comprising:
    combining a hydrocarbon feedstock and the renewable feedstock to form a combined feed;
    hydrotreating the combined feed in the presence of a hydrogen stream in a hydrotreating reactor under hydrotreating conditions to produce a hydrotreated effluent stream;
    adding water to the hydrotreated effluent stream;
    passing the hydrotreated effluent stream through a hot separator to flash a vapor stream, wherein the water is added to the hydrotreated effluent stream upstream of the hot separator;
    contacting the vapor stream with a water gas shift catalyst under water gas shift reaction conditions located in the hot separator above the inlet to the hot separator to produce a shift catalyst effluent stream, wherein the water gas shift catalyst includes copper and zinc oxide;
    passing the shift catalyst effluent stream to a cold separator to recover a cold vapor stream and a cold liquid stream comprising diesel;
    passing the cold vapor stream to a recycle gas scrubber for the removal of hydrogen sulfide and carbon dioxide to produce a recycle hydrogen stream; and
    recycling the recycle hydrogen stream having reduced concentration of hydrogen sulfide and carbon dioxide to the hydrotreating reactor.

12. The process of claim 11, wherein the water gas shift catalyst reaction is operated at a temperature range of about 150 to about 300° C.

13. The process of claim 11, wherein the hydrocarbon feedstock comprises diesel, shale oil, kerosene, gas oil and cracked feeds.

14. The process of claim 11, wherein the renewable feedstock comprises vegetable oil or animal oil.

15. The process of claim 11, wherein the renewable feedstock comprises 5-95 wt % of combined feed.

16. The process of claim 11, wherein water is added to the water gas shift catalyst bed in the form of steam or liquid.

17. A process for hydrotreating a renewable feedstock comprising:

combining a hydrocarbon feedstock and the renewable feedstock to form a combined feed;

hydrotreating the combined feed in the presence of a hydrogen stream in a hydrotreating reactor under hydrotreating conditions to produce a hydrotreated effluent stream;

cooling the hydrotreated effluent stream to provide a cooled hydrotreated effluent stream;

contacting the entire cooled hydrotreated effluent stream directly with a water gas shift catalyst under water gas shift reaction conditions to produce a shift catalyst effluent stream, wherein the water gas shift reaction is operated at a lower temperature than the hydrotreating reaction;

passing the shift catalyst effluent stream to a cold separator to recover a cold vapor stream and a cold liquid stream comprising diesel;

passing the cold vapor stream to a recycle gas scrubber for the removal of hydrogen sulfide and carbon dioxide to produce a recycle hydrogen stream; and recycling the recycle hydrogen stream having reduced concentration of hydrogen sulfide and carbon dioxide to the hydrotreating reactor.

\* \* \* \* \*